United States Patent [19]
Casson et al.

[11] Patent Number: 6,007,033
[45] Date of Patent: Dec. 28, 1999

[54] PLACARD OR BRAKE LIGHT ACCESSORY UNIT FOR VEHICLE HITCH

[75] Inventors: Daniel J. Casson, McClelland, Iowa; Shawn K. Alyasiri, Bloomington, Ill.

[73] Assignee: Thorn Industries, McClelland, Iowa

[21] Appl. No.: 09/083,778

[22] Filed: May 22, 1998

[51] Int. Cl.$^6$ ................................................ A47B 96/06
[52] U.S. Cl. ................................. 248/224.7; 248/298.1; 403/3
[58] Field of Search ................ 248/224.7, 224.8, 248/220.22, 220.31, 298.1; 280/507; 293/117; 403/3, 4

[56] References Cited

U.S. PATENT DOCUMENTS

| | | | |
|---|---|---|---|
| 3,271,050 | 9/1966 | Saunders | 293/117 |
| 3,782,761 | 1/1974 | Cardin, Sr. | 280/507 |
| 3,889,981 | 6/1975 | Westford | 280/507 |
| 4,906,015 | 3/1990 | LaCroix et al. | 280/415.1 |
| 4,938,399 | 7/1990 | Hull et al. | 280/415.1 X |
| 5,092,503 | 3/1992 | Cocks . | |
| 5,106,002 | 4/1992 | Smith et al. . | |
| 5,184,840 | 2/1993 | Edwards | 280/507 |
| 5,441,295 | 8/1995 | Smith | 280/507 |
| 5,603,178 | 2/1997 | Morrison | 40/591 |
| 5,620,198 | 4/1997 | Borchers | 280/507 |
| 5,628,536 | 5/1997 | Fulkerson | 293/117 |

*Primary Examiner*—Ramon O. Ramirez
*Attorney, Agent, or Firm*—Hovey, Williams, Timmons & Collins

[57] ABSTRACT

A placard or light accessory support (20) is provided for installing in and substantially concealing the opening of a hitch socket (22, 118). The support (20) includes an elongated tongue (28) having an attachment arm (34) and a mounting plate (44), as well as a sleeve (32) which can be used as needed. The support (20) can be adjusted to snugly fit into the opening of 1 ¼" (118) or a 2" (22) hitch socket by way of a sleeve (32) which receives the arm (34) for the larger hitch socket (22); when the smaller socket is employed, the arm (34) is directly telescoped therein without the use of the sleeve (32). The arm (34) is also provided with a specially configured, "FIG. 8" passageway which is oriented so as to receive a locking pin (23a, 119a) in different portions thereof, depending upon whether the support (20) is used with the larger socket (22) or smaller socket (118). The support (20) is moreover adapted to support a variety of accessories, such as a license plate (88), bumper sticker or similar display item (110), or an electrically operated light (132).

4 Claims, 3 Drawing Sheets

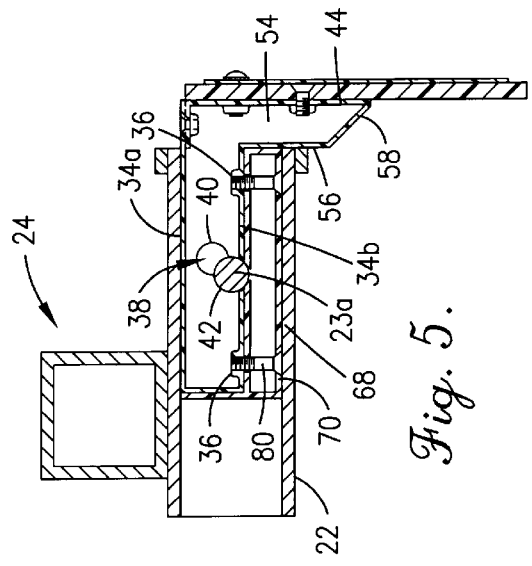
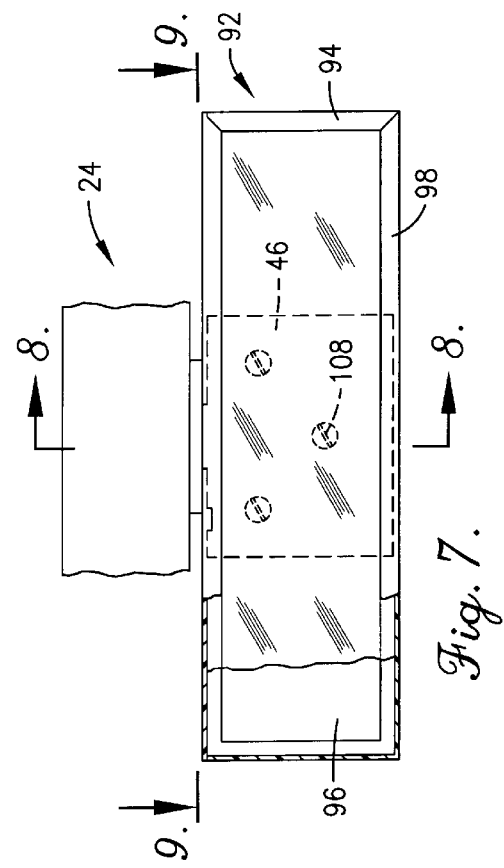
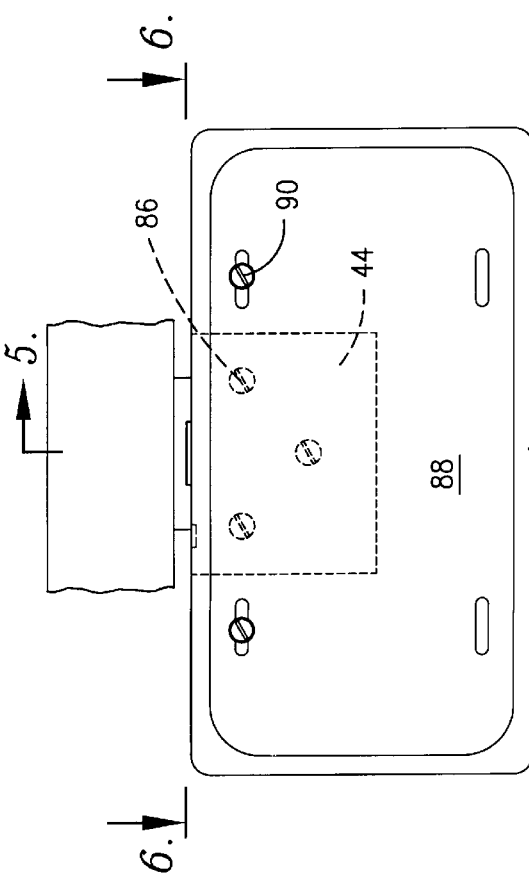
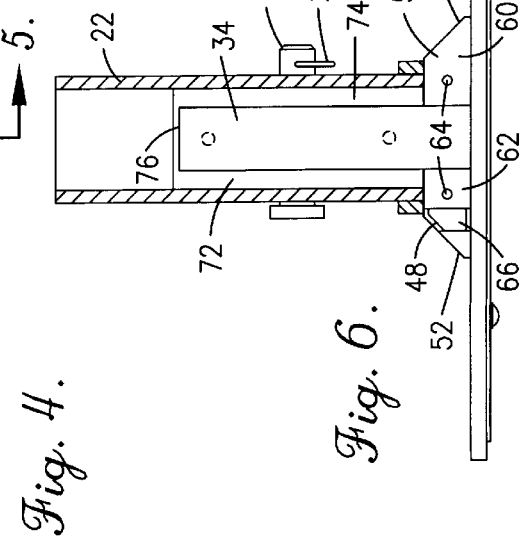

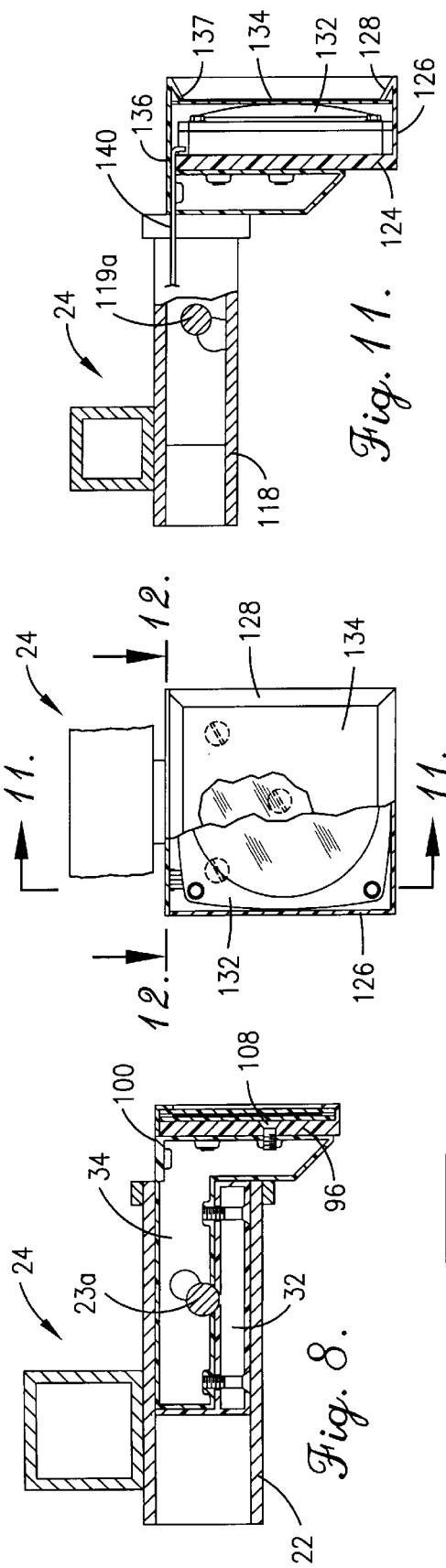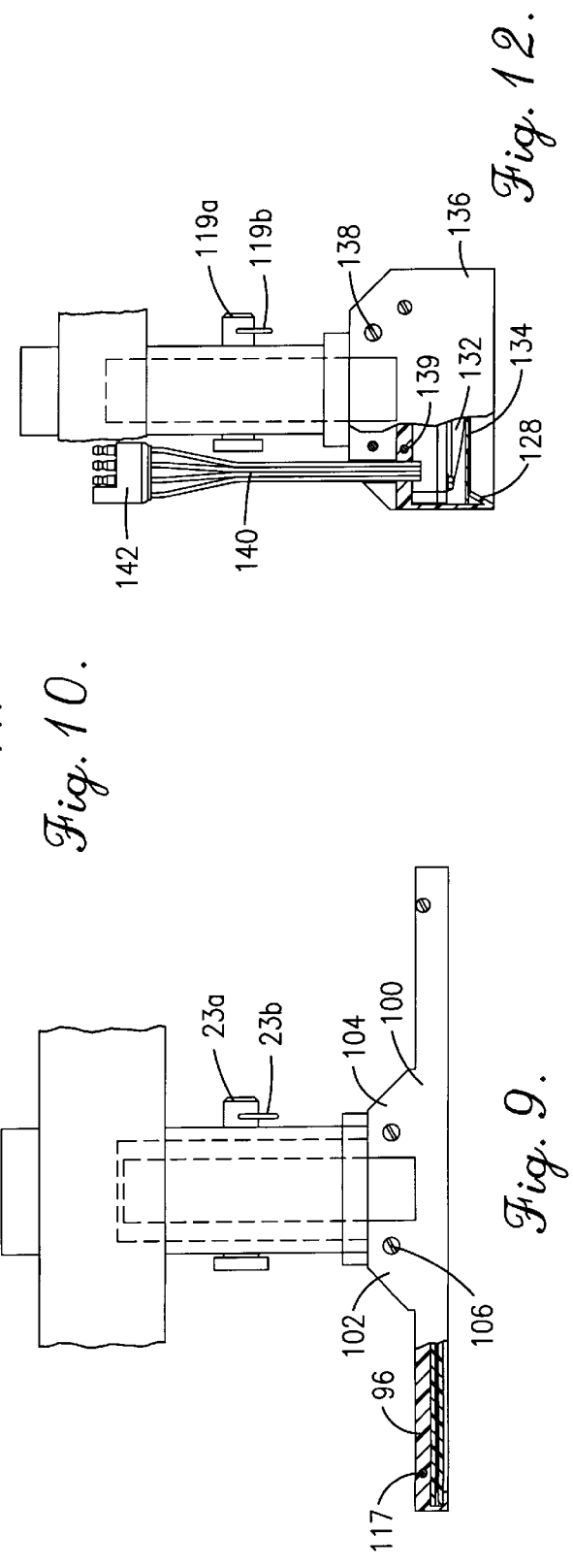

PLACARD OR BRAKE LIGHT ACCESSORY UNIT FOR VEHICLE HITCH

BACKGROUND OF THE INVENTION

1. Field of the Invention.

The present invention is broadly concerned with a decorative vehicle accessory unit that attaches to and substantially conceals the opening of a vehicle's trailer hitch socket. More particularly, the accessory includes supports of various sizes and shapes which can be removably attached to the unit for displaying removable signs, lights, or lighted signs. The accessory can be adapted as needed to fit a 2" as well as a 1¼" hitch socket and has a uniquely configured, irregularly-shaped pin-receiving opening adapted to receive a hitch pin connector used in the 1¼" hitch socket as well as in a 2" hitch socket.

2. Description of the Prior Art.

Cars, trucks, and recreational vehicles are often used to pull trailers containing boats, animals, or some other cargo. The trailer is connected to the motor vehicle by way of a hitch assembly attached underneath and at the rear of the vehicle. One type of hitch commonly used is a rectangular, tubular hitch socket which has an opening for removably receiving a tongue or hitch extension which supports a ball connector. Most vehicle owners do not leave the ball extension in the tubular hitch body between uses. When not in use, the opening of the tubular hitch socket is left exposed and is somewhat unsightly. Furthermore, an open hitch runs the risk of collecting dirt and debris, thus making it difficult to attach or insert the ball socket body adaptor a tongue within the socket.

U.S. Pat. No. 5,603,178 to Morrison provides a means for concealing the opening of an unused tubular hitch socket with an ornamental cover. This device is lacking in several respects. First, the cover of the '178 patent does not provide means for firmly securing the cover assembly to hitch socket openings of varying sizes. Instead, the '178 patent provides one size insert and one size ear component extending from that insert for securing the cover within the hitch socket opening. Thus, while this insert/ear combination may provide for attachment to one size of hitch socket such as a square 2" hitch, the attachment is not usable with a rectangular 1¼" hitch socket. Second, the '178 patent does not provide selectively removable mounts of assorted sizes and shapes nor does it provide means for selectively replacing the decorative element with the user's personal sign or display. Therefore, no matter how large or how small the desired display may be, the user can only utilize one size mount. Too small of a mount can decrease the stability of the displays attachment to the cover. Too large of a mount can lead to the unattractive sight of the mount protruding beyond the display, thus defeating the purpose of enhancing the attractiveness of the rear of the vehicle. Finally, the '178 patent fails to provide for a support which enables the use of electrically operative accessories. Some users may wish to cover the hitch opening with a lighted display or even a utility light such as a brake light. The '178 patent does not provide such an option.

There is a need in the art for a hitch cover which can be securely and tightly attached to hitches of various socket dimensions and which can support displays of a wide variety of sizes and shapes as personally selected by the user. Furthermore, the cover should be capable of supporting an electrically operative display for attachment to the hitch's standard electrical hook-up.

SUMMARY OF THE INVENTION

The present invention is directed towards a decorative vehicle accessory unit which substantially covers the otherwise undecorated opening of a trailer hitch socket. The accessory unit of this invention is easily installed within the opening of any 2" or 1¼" hitch socket opening and secured with a standard hitch socket pin. This adaptability to various hitch socket sizes is achieved by the use of a tongue member adapted to be telescoped into a 1¼" hitch socket but that is also uniquely configured to complementally fit within a channel-shaped expander/adaptor which will slide into and snugly fit within a 2" by 2" hitch socket. The tongue includes an irregularly-shaped pin-receiving passageway in the shape of a "FIG. 8" which is comprised of two adjacent lobe-type openings. The unique off-set configuration of the two openings of the tongue passageway allows the passageway to mate with the standard, transverse pin-receiving opening of either the 1¼" or 2" hitch socket, i.e., when the tongue member is directly telescoped into a 1¼" socket, one lobe-type opening of the tongue passageway mates with the socket opening, and alternately when the tongue member and the expander/adaptor are telescoped into a 2" socket, the other lobe-type opening mates with the socket opening.

In another embodiment, the unit includes a plurality of selectively interchangeable brackets or supports on which a desired decorative component can be selectively affixed by way of screws which are threadably received within openings on the mount. The mount is fixedly attached to the tongue provided with the transverse irregularly-shaped opening. The tongue is inserted into either a 1¼" hitch opening or, alternatively, the tongue inserted into the channel-shaped tongue expander and the assembly is then inserted into a 2" hitch opening as described above.

Numerous signs or displays can be mounted on the unit of this invention. For example, one bracket of this invention may be utilized to support a bumper sticker, while another is especially adapted to bracket support a placard similar in size and dimension to a standard license plate. Furthermore, if desired, a third support bracket may be made available which provides for the mounting of an electrical accessory such as a light. This latter bracket includes a recess allowing the electrical wiring of the accessory to pass through the bracket and to be attached to the conventional electrical power supply adjacent the hitch.

The tongue and tongue expander of this invention can be of varying dimensions. Furthermore, if a longer tongue is necessary (such as on automobiles where the hitch is located directly underneath the car and behind the bumper) an extension can be connected to the tongue and inserted within the hitch socket. Because of the elongated, tubular shape of the tongue socket and of the component resulting from the placement of the tongue within the tongue expander, display units of this invention are firmly and securely attached within the hitch socket opening with a stability that has been lacking in previous accessory units.

BRIEF DESCRIPTION OF THE DRAWINGS

FIG. 4 is a fragmentary end view of the assembly of FIG. 1;

FIG. 5 is a vertical sectional view taken along line 5—5 of FIG. 4;

FIG. 6 is a sectional view taken along line 6—6 of FIG. 4;

FIG. 7 is a fragmentary view in partial vertical section and with parts broken away illustrating in detail the assembly of FIG. 2;

FIG. 8 is a vertical sectional view taken along line 8—8 of FIG. 7;

FIG. 9 is a sectional view taken along line 9—9 of FIG. 7;

FIG. 10 is a fragmentary view in partial vertical section and with parts broken away illustrating in detail the assembly of FIG. 3;

FIG. 11 is a vertical sectional view taken along line 11—11 of FIG. 10; and

FIG. 12 is a sectional view taken along line 12—12 of FIG. 10.

DETAILED DESCRIPTION OF THE PREFERRED EMBODIMENTS

Figure 1:
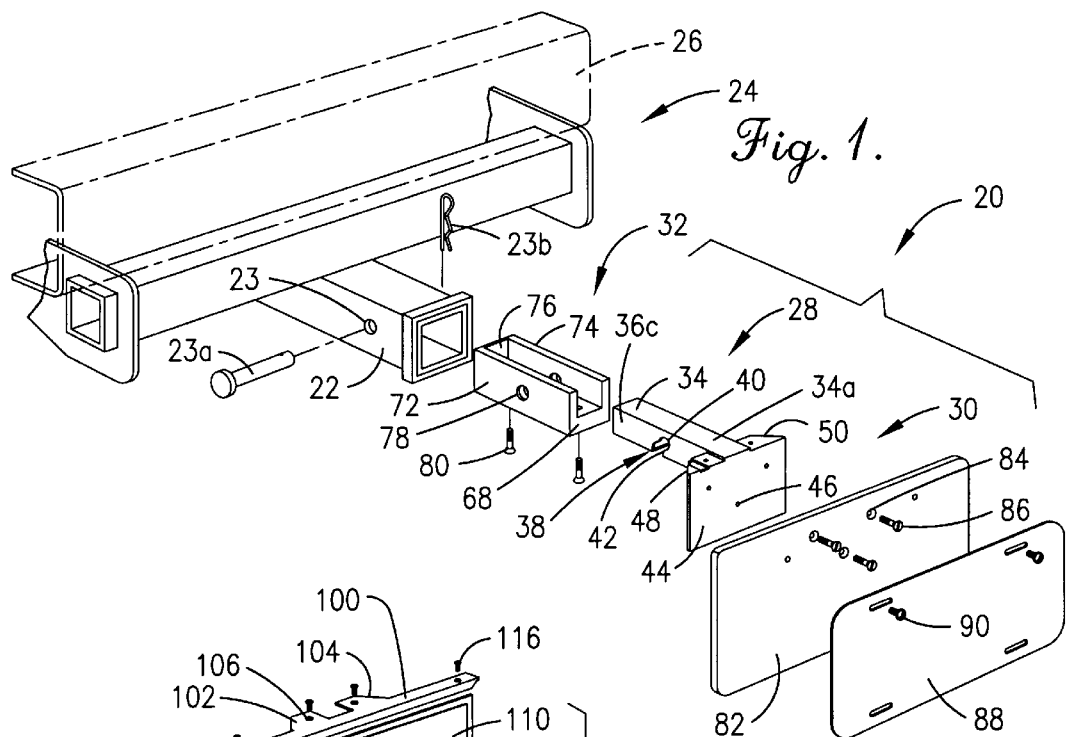
FIG. 1 is a perspective view of the accessory unit of the invention with the tongue removed from the hitch to show in detail the method of attachment of the tongue and tongue expansion device to the hitch and further illustrating in detail the method of attachment of the support and display to the mount.

Turning now to the drawings, and particularly FIGS. 1, an accessory support 20 is illustrated in exploded relationship. As shown, the unit 20 is adapted to fit within a standard 2" elongated socket 22 forming a part of a hitch assembly 24, the latter being mounted to a frame member 26 of a vehicle. The unit 20 includes an elongated tongue 28 having an integral mounting assembly 30 at one end thereof, as well as a generally U-shaped in cross-section synthetic resin sleeve32.

The socket 22 is in the form of a square tube and conventionally has a central opening which is either 1¼" or 2" in cross-section. As illustrated, the square tube has a through opening 23 adapted to receive an elongated, headed locking pin 23a, the latter being held in place via cotter pin 23b.

The tongue 28 includes an elongated, generally square in cross-section hollow arm 34 having top and bottom walls 34a, 34b and sidewalls 36c. The arm 34 also has a pair of laterally spaced apart threaded bores 36 through the bottom wall 34b thereof (see FIG. 5), as well as a transversely extending, somewhat "FIG. 8" shaped passageway 38 therethrough; the passageway 38 presents a pair of lobe-type openings 40, 42 which are in communication with each other and are important for purposes to be described. As best seen in FIG. 5, the lower opening 42 terminates at the bottom wall of the arm 34.

The integral mounting assembly 30 is in the form of a generally rectangular, flat plate 44 having three threaded bores 46 formed therein. In addition, the assembly 30 has a pair of upright tubular sections 48,50 respectively located on opposite sides of the arm 34. As best seen in FIGS. 5 and 6, each of the sections 48,50 includes an upright, rearwardly extending, oblique sidewall 52,54. In addition, a planar, depending back wall 56 integral with the bottom wall 34b and extends the full width of plate 44. Finally, an oblique bottom wall 58 extends from the lower margin of wall 56 and joins with the lower margin of plate 44. As best seen in FIG. 6, a pair of spaced, laterally outwardly extending top plates 60,62 complete the sections 48,50. Each of the top plates 60,62 has a threaded bore 64 therein, and it will also be seen that the plate 62 has a relieved area 66 therein which is important for purposes to be made clear.

The sleeve 32 includes a planar bottom wall 68 provided with a pair of screw-receiving openings 70 therethrough, together with upstanding marginal walls 72,74 and back wall 76. The sidewalls 72,74 have a pair of aligned pin-receiving openings 78 provided therethrough.

In the use of unit 20, the arm 34 is telescopically received within the sleeve 32, with the end of arm 34 remote from plate 46 in abutment with back wall 76. Screws 80 are employed for securing the arm 34 within the sleeve 32, as will be seen from a consideration of FIG. 5. Next, the entire assembly, made up of the intermitted tongue 28 and sleeve 32 is telescopically fitted within socket 22 in alignment such that the openings 23 align with the openings 78. In addition, owing to the specialized configuration of the passageway 38, the lower opening 42 thereof is likewise in alignment with the openings 23 and 78. In this orientation, the pin 23a is then passed through the socket 22, sleeve 32 and tongue 28, and is releasably maintained in positioned via cotter pin 23b.

It will be seen that the plate 44 thus blocks the normally opened socket 22 and presents a flat mounting surface. In the embodiment of FIG. 1, a license plate mount 82 is employed which has screw openings 84 therein in alignment with the threaded bores 46. Screws 86 are thus employed to secure the plate mount 82 to the plate 44. Thereupon, an official or decorative license plate 88 can be releasably secured to the plate mount 82 via screws 90 received within corresponding bores in the plate mount.

Figure 2:
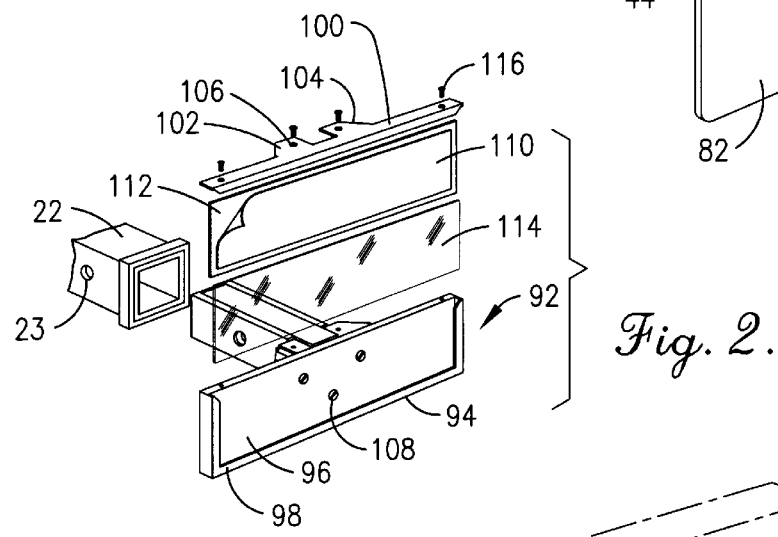
FIG. 2 is a perspective view illustrating an alternative to the display configuration of FIG. 1 with the tongue removed from the hitch to show in detail the method of attachment of the tongue to the hitch and further illustrating the method of attachment of the decorative display to the bracket.

Turning next to FIG. 2, another embodiment of the invention is illustrated, which is specifically designed to support a bumper sticker or other elongated, rectangular display item. In this embodiment, the unit 20 is identical with that described previously, except that, in lieu of the plate mount 82, a holder assembly 92 is provided. The assembly 92 includes an open top, main body 94 presenting an apertured rear plate 96 and a forwardly extending, generally U-shaped lip 98. In addition, a top cover 100 is provided having a pair of laterally spaced apart, central mounts 102, 104 each having a screw-receiving opening 106 therein. The main body 94 is affixed to plate 44 via screws 108, in the same manner as described with the plate mount 82. Next, a display item such as a bumper sticker 110, adhesively secured to a backing 112, is slid into the main body 94 and held therein by means of the lip 98. A transparent protective cover 114 is similarly positioned in front of the sticker 110. Finally, the top cover 100 is secured by screws 116 through the openings 106 into the threaded bores 64, and through the end margins thereof into appropriate threaded openings 117 forming a part of the main body 94.

Figure 3:
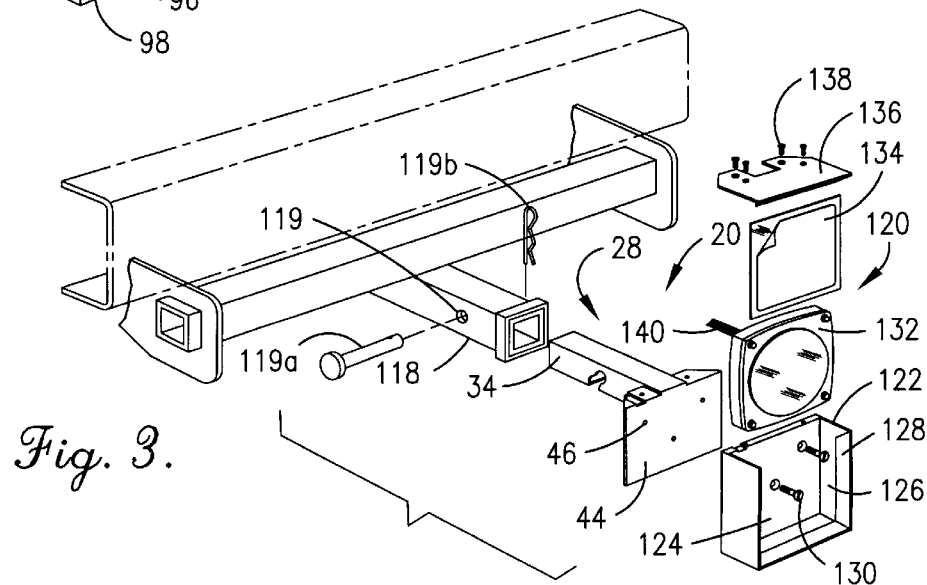
FIG. 3 is an exploded perspective view similar to that of FIG. 1 but depicting a standard 1¼" hitch assembly with the improvements of the present invention including a lighted accessory mounted on the assembly tongue.

Turning now to FIG. 3, the use of unit 20 is shown in connection with a standard 1¼ hitch socket 118 and an illuminated display assembly 120. The socket 118 has pin-receiving through openings 119 therein, adapted to receive headed pin 119a, the latter maintained in place by cotter pin 119b. Normally, the pin 119a would be identical with the pin 23a of the first embodiment. The tongue 28 is identical with that described in connection with FIG. 1, but, owing to the smaller socket 118, the sleeve 32 is not employed. Rather, in this instance, the arm 34 is telescoped directly into the socket 118 without use of the sleeve. In such a use, the upper opening 40 forming a part of passageway 38 comes into registry with the socket openings 119, so as to allow through insertion of the pin 119a to thus lock the tongue 28 in place.

The illuminated display assembly 120 includes a mounting box 122 having an apertured back wall 124, and a continuous, generally U-shaped, forwardly extending wall 126 terminating with an inwardly extending retention lip 128. As shown, the mounting box 122 is affixed to plate 44 via screws 130. The mounting box in turn receives a generally rectangular lighting unit 132 which is positioned between back wall 124 and retention lip 128. A front lens 134 is then positioned in front of the unit 132, and a top plate 136 provided with a rearwardly extending retention lip 137 completes the construction, with screws 138 extending into the bore 64 and into appropriate openings 139 forming apart of the box 122. The unit 132 includes electrical cables 140 which extend toward socket 118. Passage of these cables 140 is accommodated by the relieved area 66 provided in top plate 62, as best seen in FIG. 12. These cables are in turn connected with a conventional coupler 142 for attachment to the lighting system of the towed vehicle.

We claim:

1. An accessory support unit for alternate mounting to a plurality of elongated hitch sockets presenting openings of different sizes, each of said plurality of hitch sockets including a transverse pin-receiving opening, said unit comprising:

an elongated tongue having a mounting assembly for an accessory connected to one end thereof, said tongue adapted to telescopically fit within a first hitch socket presenting an opening of a first size; and a sleeve adapted to receive said tongue and configured for telescopic fitting within a second hitch socket presenting an opening of a second size greater than said first size, said tongue having structure defining first and second pin-receiving holes therethrough, said first pin-receiving hole mating with the pin-receiving opening of said first hitch socket when said tongue is telescoped into said first hitch socket, said second pin-receiving hole mating with the pin-receiving opening of said second hitch socket when said tongue and sleeve are telescoped into said second hitch socket.

2. The support of claim 1, said first and second holes being in communication and together forming an irregular passageway through said tongue.

3. The support of claim 2, said accessory comprising a light.

4. An accessory support unit for mounting to an elongated hitch socket and comprising an elongated tongue having a mounting assembly for an accessory connected to one end thereof, said tongue adapted to be telescopically received within a first hitch socket presenting a first opening of a first size, there being a sleeve configured to receive said tongue, said sleeve being adapted to be configured to be telescopically received within a second hitch socket presenting a second opening of a second size larger than said first size, said mounting assembly including a plurality of differently configured accessory supports, each of said accessory supports being alternately attachable to said mounting assembly and adapted for supporting a different accessory.

* * * * *